US006059198A

United States Patent [19]

Moroi et al.

[11] Patent Number: 6,059,198

[45] Date of Patent: May 9, 2000

[54] COOLANT CIRCULATION SYSTEM

[75] Inventors: Takahiro Moroi; Takashi Ban; Tatsuyuki Hoshino; Hidefumi Mori, all of Kariya, Japan

[73] Assignee: Kabushiki Kaisha Toyoda Jidoshokki Seisakusho, Kariya, Japan

[21] Appl. No.: 09/154,798

[22] Filed: Sep. 17, 1998

[30] Foreign Application Priority Data

Sep. 17, 1997 [JP] Japan .................................... 9-251558

[51] Int. Cl.[7] ....................................................... B60H 1/02

[52] U.S. Cl. ...................................... 237/12.3 R; 126/247; 122/26

[58] Field of Search ......................... 237/12.3 R, 12.3 B; 126/247; 122/26; 123/142.5 R, 41.31

[56] References Cited

U.S. PATENT DOCUMENTS 4,974,778 12/1990 Bertling ............................. 237/12.3 B
4,993,377 2/1991 Itakura ............................. 123/142.1 R
5,273,105 12/1993 Higashihara et al. .................... 165/12
5,655,485 8/1997 Kusase et al. ........................ 123/41.31
5,836,270 11/1998 Aoki et al. ........................... 123/41.31

FOREIGN PATENT DOCUMENTS 2619206 2/1989 France .

*Primary Examiner*—Henry Bennett
*Assistant Examiner*—Derek S. Boles
*Attorney, Agent, or Firm*—Woodcock Washburn Kurtz Mackiewicz & Norris LLP

[57] ABSTRACT

A coolant circulation system for circulating a coolant through a coolant passage of a liquid-cooled engine, a radiator of an engine cooling system and a heat exchanger of a passenger compartment heating system. The coolant circulation system includes a coolant circuit provided for a fluidic communication between the coolant passage, the radiator and the heat exchanger. A coolant is forcibly circulated in the coolant circuit by a coolant pump. The coolant circulation system further includes a supplementary heat source arranged in the coolant circuit to heat the coolant flowing out of the heat exchanger. The coolant heated by the supplementary heat source is directed to the coolant passage. The supplementary heat source may be formed as a viscous fluid type heat generator.

8 Claims, 4 Drawing Sheets

COOLANT CIRCULATION SYSTEM

BACKGROUND OF THE INVENTION

1. Field of the Invention

The present invention relates to a coolant circulation system for circulating a coolant through a coolant passage of a liquid-cooled engine, a radiator for an engine cooling system and a heat exchanger for a passenger compartment heating system.

2. Description of the Related Art

A conventional coolant circulation system in motor vehicles includes a coolant circulating circuit provided with conduits made of, e.g., flexible hoses, which extends to provide a fluidic communication between a water jacket or coolant passage formed in a vehicle engine, a radiator used in an engine cooling system and a heat exchanger used in a passenger compartment heating system. The conventional coolant circulation system also includes a coolant pump provided adjacent to and operationally connected with the engine to forcibly circulate a coolant in the circuit. The coolant flowing through the water jacket exchanges heat with the engine to cool the latter. One part of the heated coolant passing through the water jacket is directed to the radiator to thereby be cooled to an appropriate temperature, and the other part of the heated coolant is directed to the heat exchanger to warm a passenger compartment.

In the conventional coolant circulation system, the heat source for warming the passenger compartment depends only on the heat generation of the engine, and therefore, it is generally difficult to warm the passenger compartment to a satisfactory temperature until a sufficient time has passed after the engine starts, especially in cold districts. Also, it is generally difficult for the cooled engine to perform a proper combustion until the engine is self-heated to a certain degree due to the heat generation thereof, which may deteriorate a combustion efficiency and may generate a polluted exhaust gas.

U.S. Pat. No. 4,974,778 (Bertling) discloses a heating system, for a vehicle occupant space, which includes a supplementary heat source or heating unit incorporated in a coolant circuit of the heating system. In this coolant circuit, a coolant flows from a liquid-cooled engine to the heating unit to be additionally heated by the latter, and the additionally heated coolant is supplied from the heating unit to a heat exchanger of the heating system. Therefore, it is made possible to warm the passenger compartment to a satisfactory temperature even if a sufficient time has not passed after the engine starts, and even in the cold districts.

FR 2 619 206-A1 also discloses a supplementary heat source incorporated in a coolant circuit of a heating system, and teaches that the supplementary heat source can serve to warm up an engine.

In the conventional coolant circulating system, the coolant heated by the supplementary heat source is supplied to the heat exchanger arranged downstream of and adjacent to the supplementary heat source, and thereby it is possible to promptly warm the passenger compartment with the aid of the supplementary heat source. However, the coolant passed through the heat exchanger, the temperature of which has been decreased in a certain degree, is supplied to and flows in the water jacket or coolant passage of the engine, so that it is made difficult for the coolant to quickly warm up the engine. Therefore, it is difficult to run a motor vehicle in a proper condition of, e.g., the combustion efficiency of the engine, immediately after the engine starts or until the engine is sufficiently self-heated. Also, the heat generated from the engine, which is generally most useful in the heating system for the passenger compartment, is not fully utilized in the heating system.

SUMMARY OF THE INVENTION

It is, therefore, an object of the present invention to provide a coolant circulating system which can solve the above-mentioned problems of the conventional system.

It is another object of the present invention to provide a coolant circulating system which enables a coolant to quickly warm up a liquid-cooled engine, so as to run a motor vehicle in a proper condition of, e.g., the combustion efficiency of the engine, immediately after the engine starts, and also makes it possible to effectively warm a passenger compartment to a satisfactory temperature.

In accordance with the present invention, there is provided a coolant circulation system for circulating a coolant through a coolant passage of an engine, a radiator of a cooling system and a heat exchanger of a heating system, comprising a coolant circuit provided for a fluidic communication between the coolant passage, the radiator and the heat exchanger, a coolant being forcibly circulated in the coolant circuit; and a supplementary heat source arranged in the coolant circuit to heat the coolant flowing out of the heat exchanger, wherein the coolant heated by the supplementary heat source is directed to the coolant passage.

In this coolant circulating system, it is preferred that the coolant circuit includes a first circulation route in which the radiator is arranged and a second circulation route in which the heat exchanger is arranged, the first and second circulation routes defining a parallel circuit relative to the coolant passage.

In this arrangement, the coolant circulating system may further comprise a valve provided in the first circulation route to shut off a coolant flow from the coolant passage to the radiator.

Also, in this arrangement, the coolant circulating system may further comprise a conduit provided in the first circulation route to bypass the radiator, and the valve may change a coolant flowing direction in the first circulation route to direct the coolant toward either one of the radiator and the conduit.

It is advantageous that the supplementary heat source comprises a heat generator which includes a housing assembly defining therein a heat generating chamber and a heat receiving chamber arranged adjacent to the heat generating chamber, the heat receiving chamber permitting the coolant to flow through the heat receiving chamber to thereby receive heat transferred from the heat generating chamber; a drive shaft rotatably supported by the housing assembly; a rotor element mounted on the drive shaft for rotation within the heat generating chamber, the rotor element including outer surfaces defining a gap with inner wall surfaces of the heat generating chamber; and a viscous fluid held in the gap for heat generation when a shearing stress is applied by the rotation of the rotor element.

In this arrangement, the coolant circulating system may further comprise a pump provided to forcibly circulate the coolant in the coolant circuit, and at least one of the housing assembly and the drive shaft of the heat generator may be in common use in the pump.

The present invention further provides a method for circulating a coolant through a coolant passage of an engine, a radiator of a cooling system and a heat exchanger of a heating system, comprising the steps of heating the coolant just having passed through the heat exchanger at an outside of the coolant passage of the engine; and directing the coolant thus heated toward the coolant passage.

In this method, it is preferred that the coolant is circulated in a coolant circuit including a first circulation route in which the radiator is arranged and a second circulation route in which the heat exchanger is arranged, the first and second circulation routes defining a parallel circuit relative to the coolant passage.

BRIEF DESCRIPTION OF THE DRAWINGS

The above and other objects, features and advantages of the present invention will become more apparent from the following description of preferred embodiments in connection with the accompanying drawings, in which.

DETAILED DESCRIPTION OF THE PREFERRED EMBODIMENTS

Figure 1:
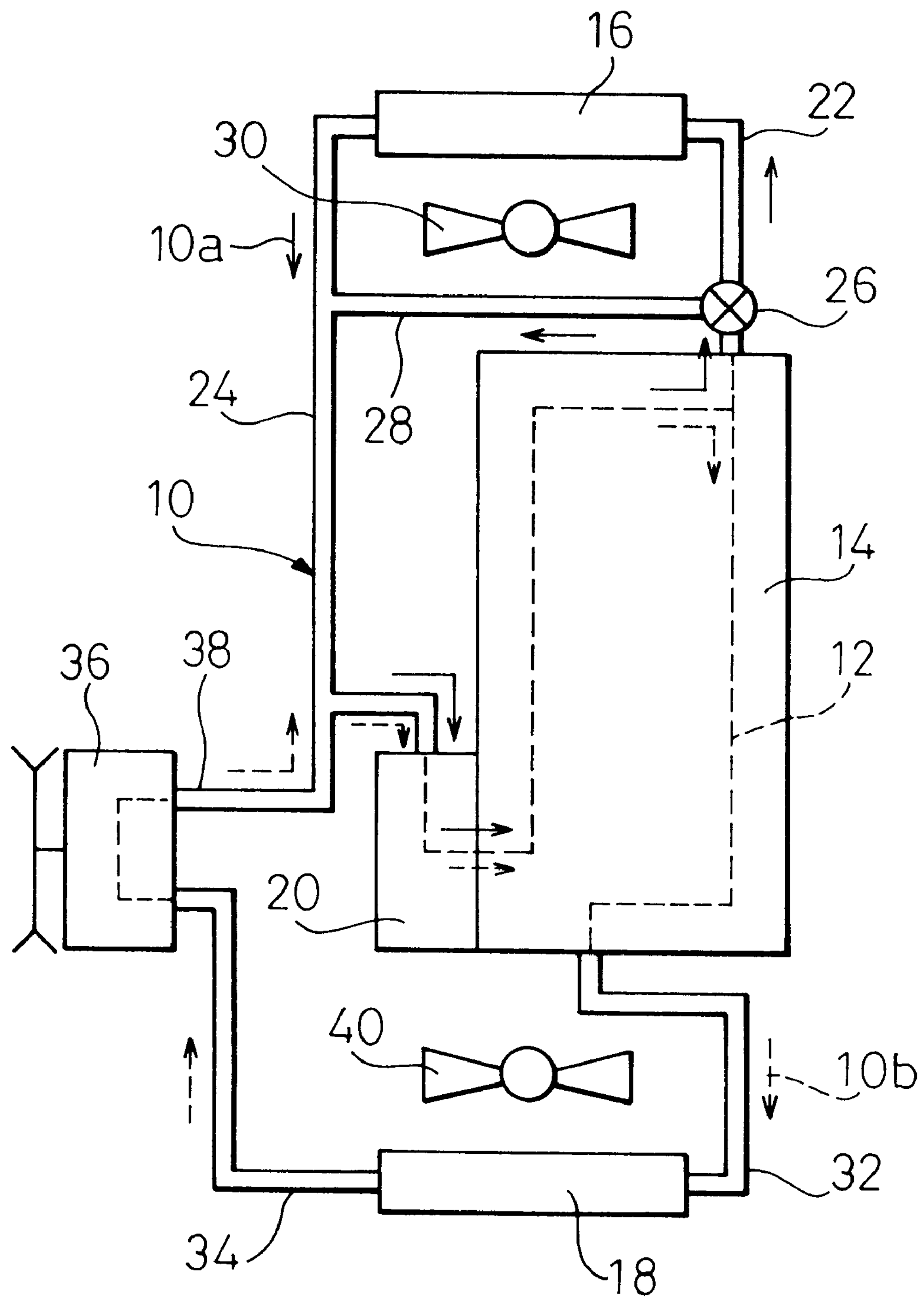
FIG. 1 is a schematic and diagrammatic illustration of a first embodiment of a coolant circulation system according to the present invention.

Referring now to the drawings, wherein the same or similar components are designated by the same reference numerals, FIG. 1 shows a first embodiment of a coolant circulation system according to the present invention.

The coolant circulation system of this embodiment, incorporated in a motor vehicle (not shown), includes a coolant circulation circuit 10 which extends to provide a fluidic communication between a water jacket or coolant passage 12 formed in a liquid-cooled vehicle engine 14, a radiator 16 provided in an engine cooling system of the vehicle, and a heater core or heat exchanger 18 provided in a passenger compartment heating system of the vehicle. The coolant circulation system also includes a water or coolant pump 20 provided adjacent to and operationally connected with the engine 14 to forcibly circulate a coolant or cooling fluid, generally made of water, in the circuit 10. The output side of the pump chamber (not shown) of the coolant pump 20 is directly connected to the inlet of the coolant passage 12 of the engine 14.

The coolant circuit 10 includes a first circulation route **10*a* (shown by solid arrows) for the engine cooling system and a second circulation route 10*b* (shown by broken arrows) for the passenger compartment heating system. The first and second circulation routes 10*a*, 10*b* are arranged to define a parallel circuit relative to the coolant passage 12 of the engine 14**.

The first circulation route **10*a* is provided with a first conduit 22 for connecting the outlet of the coolant passage 12 of the engine 14 with the inlet of the radiator 16, and a second conduit 24 for connecting the outlet of the radiator 16 with the input side of the coolant pump 20. A three way valve 26, such as a thermostat, is arranged intermediately in the first conduit 22, and a bypass conduit 28 extends from the valve 26 and leads to the second conduit 24 to branch off the first conduit 22 to bypass the radiator 16. The valve 26 changes the direction of flow of the coolant in the first circulation route 10*a* so as to direct the coolant toward either one of the radiator 16 and the bypass conduit 28, depending on the temperature of the coolant. A fan 30 is disposed near the radiator 16** to positively cool the coolant flowing in the latter.

The second circulation route **10*b* is provided with a third conduit 32 for connecting the outlet of the coolant passage 12 of the engine 14 with the inlet of the heat exchanger 18, a fourth conduit 34 for connecting the outlet of the heat exchanger 18 with the inlet port of a heat generator 36 as a supplementary heat source, and a fifth conduit 38 for connecting the outlet port of the heat generator 36 with the second conduit 24 at the downstream of the bypass conduit 28. A fan 40 is disposed near the heat exchanger 18 to positively cool the coolant flowing in the latter. The conduits 22, 24, 28, 32, 34, 38** may be made of, e.g., flexible hoses.

In the coolant circuit 10, the coolant flowing through the coolant passage 12 exchanges heat with the engine 14 to cool the latter. One part of the heated coolant passing through the coolant passage 12 is directed to the radiator 16 to thereby be cooled to an appropriate temperature, and the other part of the heated coolant is directed to the heat exchanger 18 to warm a passenger compartment of the vehicle.

Figure 2:
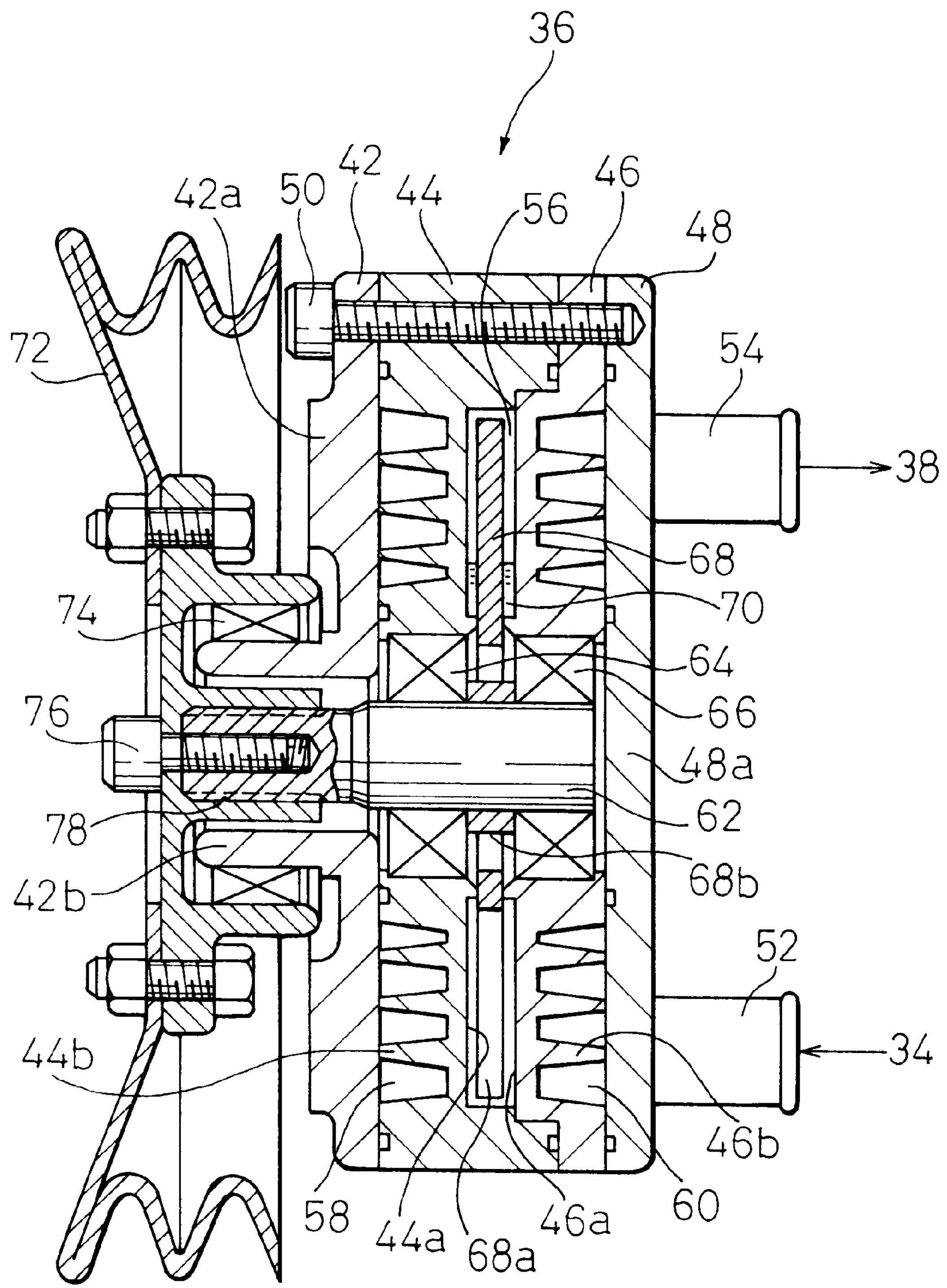
FIG. 2 is a vertical sectional view of a heat generator used in the coolant circulation system of FIG. 1.

As shown in FIG. 2, the heat generator 36 includes a front housing body 42, a front partition plate 44, a rear partition plate 46 and a rear housing body 48. The front and rear partition plates 44, 46 are stacked with each other through the interposition of an O-ring hermetically sealing between the outer peripheral regions of the mutually opposed surfaces of the partition plates 44, 46. The stacked front and rear partition plates 44, 46 are securely and tightly held between the front and rear housing bodies 42, 48 through the interposition of plural O-rings. The O-rings are arranged to hermetically seal between the inner and outer peripheral regions of the front housing body 42 and the front partition plate 44, as well as between the inner and outer peripheral regions of the rear housing body 48 and the rear partition plate 46, respectively. The front and rear housing bodies 42, 48 and the front and rear partition plates 44, 46 thus stacked, are axially and tightly combined by a plurality of screw bolts 50 (only one bolt 50 is shown in FIG. 2) to form a housing assembly of the heat generator 36.

The front housing body 42 includes a flat annular plate section **42*a* and a center boss 42*b* integrally extending axially frontward from the radially inner edge of the annular plate section 42*a* to define therein a center through bore. The rear housing body 48 includes a flat plate section 48*a* and inlet and outlet ports 52, 54 integrally extending rearward from the flat plate section 48*a***.

The front partition plate 44 is provided, on the rear surface thereof, with an annular recess **44*a*. A flat annular rear surface part and a cylindrical circumferential surface part of the annular recess 44*a* cooperate with the flat annular front surface part of the front surface 46*a* of the rear partition plate 46 to define a heat generating chamber 56. Thus, the rear surface part and circumferential surface part of the annular recess 44*a* as well as the front surface part of the front surface 46*a* constitute the inner wall surfaces of the heat generating chamber 56**.

The front partition plate 44 is also provided, on the front surface thereof, with an annular recess in which three C-shaped ridges **44*b* are formed so as to concentrically extend axially frontward around the center through hole of the front partition plate 44. The front surface of the front partition plate 44, involving the surfaces of annular recess and C-shaped ridges 44***b*, cooperates with a flat rear surface of the annular plate section 42*a* of the front housing body 42 to define a C-shaped front heat receiving chamber 58 arranged near the front side of the heat generating chamber 56. The front heat receiving chamber 58 is separated in a fluid-tight manner from the heat generating chamber 56 through the front partition plate 44.

The rear partition plate 46 is also provided, on the rear surface thereof, with an annular recess in which three C-shaped ridges 46*b* are formed so as to concentrically extend axially rearward around the center through hole of the rear partition plate 46. The rear surface of the rear partition plate 46, involving the surfaces of annular recess and C-shaped ridges 46*b*, cooperates with a flat front surface of the plate section 48*a* of the rear housing body 48 to define a C-shaped rear heat receiving chamber 60 arranged near the rear side of the heat generating chamber 56. The rear heat receiving chamber 60 is separated in a fluid-tight manner from the heat generating chamber 56 through the rear partition plate 46.

The inlet port 52 formed on the rear housing body 48 communicates with the front and rear heat receiving chambers 58, 60 through channels (not shown) formed respectively in the front and rear partition plates 44, 46 and the rear housing body 48. Also, the outlet port 54 formed on the rear housing body 48 communicates with the front and rear heat receiving chambers 58, 60 through the other channels (not shown) formed respectively in the front and rear partition plates 44, 46 and the rear housing body 48.

The inlet port 52 is connected with the fourth conduit 34 of the second circulation route 10*b* of the coolant circuit 10. Also, the outlet port 54 is connected with the fifth conduit 38 of the second circulation route 10*b* of the coolant circuit 10. The coolant circulating through the second circulation route 10*b* for the passenger compartment heating system is introduced from the fourth conduit 34 through the inlet port 52 into the front and rear heat receiving chambers 58, 60, flows along substantially circular passages defined by the annular ridges 44*b*, 46*b* in the front and rear heat receiving chambers 58, 60, and is discharged from the front and rear heat receiving chambers 58, 60 through the outlet port 54 into the fifth conduit 38. The annular ridges 44*b*, 46*b* serve to increase heat exchanging surface areas between the coolant and the front and rear partition plates 44, 46.

A drive shaft 62, typically positioned in a substantially horizontal state, extends in the center through bore of the front housing body 42 and the center through holes of the front and rear partition plates 44, 46, and is supported for rotation by bearing units 64, 66 respectively mounted in the center through holes. Both bearing units 64, 66 are provided with shaft sealing means (not shown). Consequently, the heat generating chamber 56 is sealed in a fluid-tight manner from the exterior of the heat generator 36.

A rotor element 68 in the shape of a flat circular disk is fixedly mounted or press fitted onto the drive shaft 62 at a location between the bearing units 64, 66, and is arranged within the heat generating chamber 56 for rotation together with the drive shaft 62. The rotor element 68 has axially opposed front and rear annular surfaces and an outer circumferential surface, which constitute the outer surfaces of the rotor element 68. The outer surfaces of the rotor element 68 do not come into contact with the inner wall surfaces of the heat generating chamber 56 at any time, and thus define therebetween a relatively narrow fluid-tight gap for holding a viscous fluid 70.

The rotor element 68 is provided with a plurality of radial slits 68*a* (only one slit 68*a* is shown) each of which extends between the front, rear and circumferential surfaces of the rotor element 68. The slits 68*a* serve to enhance the shearing effect for the viscous fluid 70 due to the rotating rotor element 68, and also serve to facilitate the radial displacement of the viscous fluid 70 held in the fluid-tight gap toward the outer peripheral region thereof when the rotor element 68 rotates. The rotor element 68 is also provided with a plurality of through holes 68*b* (only two through holes are shown) formed in the radially inner region of the rotor element 68. Each through hole 68*b* extends between the front and rear surfaces of the rotor element 68 to communicate the front and rear side of the latter.

The viscous fluid 70, such as silicone oil, is enclosed within the fluid-tight gap defined in the heat generating chamber 56 at an amount of approximately 40 to 70 volume percent.

A pulley 72 is rotatably supported through a bearing unit 74 on the center boss 42*b* of the front housing body 42, and is fixedly mounted on the drive shaft 62 at the front end of the latter through a bolt 76 and a spline 78. The pulley 72 is operationally connected by a belt (not shown) to the vehicle engine 14 (FIG. 1). It will be appreciated that the drive shaft 62 may be connected through a known electromagnetic clutch to the vehicle engine 14, instead of the pulley 72.

The mode of operation of the coolant circulation system of the above embodiment is described below. When the engine 14 starts in a relatively cold condition in, e.g., a cold district, the temperature of the coolant is relatively low, and, during this state, the valve 26 shuts off the flow of the coolant from the coolant passage 12 of the engine 14 to the radiator 16 in the first conduit 22 of the first circulation route 10*a* of the coolant circuit 10, and allows the coolant to flow through the bypass conduit 28. Then, the coolant pump 20 operates to circulate the coolant through the first and second circulation routes 10*a*, lob, i.e., through the coolant passage 12, a part of the first conduit 22 arranged upstream of the valve 26, the bypass conduit 28, a part of the second conduit 24 arranged downstream of the bypass conduit 28, the third conduit 32, the heat exchanger 18, the fourth conduit 34, the heat generator 36, the fifth conduit 38 and the coolant pump 20.

During this state, the drive shaft 62 of the heat generator 36 is operated by the engine 14, and thereby the rotor element 68 is rotated within the heat generating chamber 56. Therefore, the viscous fluid 70 such as silicone oil held in the fluid-tight gap between the inner wall surfaces of the heat generating chamber 56 and the outer surfaces of the rotor element 68 is subjected to a shearing stress by the rotating rotor element 68, so as to generate heat. The heat generated by the viscous fluid 70 is transferred to the coolant flowing through the front and rear heat receiving chambers 58, 60. In this manner, the coolant with a relatively low temperature flowing through the second circulation route 10*b* is heated by the heat generator 36, and the coolant thus heated is directed through the fifth conduit 38, a part of the second conduit 24 arranged downstream of the fifth conduit 38 and the pump chamber of the coolant pump 20 toward the coolant passage 12 of the engine 14.

In the coolant circulation system mentioned above, the coolant heated by the heat generator 36 is directed to the coolant passage 12 of the engine 14 with no heat exchanger of the passenger compartment heating system being disposed therebetween. Thereby, it is possible to quickly warm up the engine 14, and to run a motor vehicle in a proper condition of, e.g., the combustion efficiency of the engine 14, immediately after the engine 14 starts or until the engine

14 is sufficiently self-heated. At the same time, the coolant having passed through the coolant passage 12 and thus additionally heated by the engine 14 is directed to the heat exchanger 18. Thereby, it is possible to effectively warm a passenger compartment to a satisfactory temperature, with the aid of the fan 40.

Accordingly, in the coolant circulation system of the first embodiment, it is ensured to prevent the coolant heated by the heat generator 36 from being cooled by flowing through the heat exchanger of the passenger compartment heating system. Consequently, the heat of the coolant is effectively used for warming-up the engine 14 and for warming the passenger compartment. Also, the heat generated from the engine 14, which is generally most useful in the passenger compartment heating system, is fully utilized in the heating system, so as to quickly warm the passenger compartment.

When the coolant is sufficiently heated by the heat generated from the engine 14 and the heat generator 36, the valve 26 shuts off the flow of the coolant through the bypass conduit 28, and allows the coolant flowing out of the coolant passage 12 to be directed to the radiator 16. Thus, the coolant pump 20 circulates the coolant through the coolant passage 12, the first conduit 22, the radiator 16 and the second conduit 24, in addition to the second circulation route lob. Consequently, the heated coolant is cooled by the radiator 16 with the aid of the fan 30, and the coolant thus cooled serves to cool the engine 14.

Figure 3:
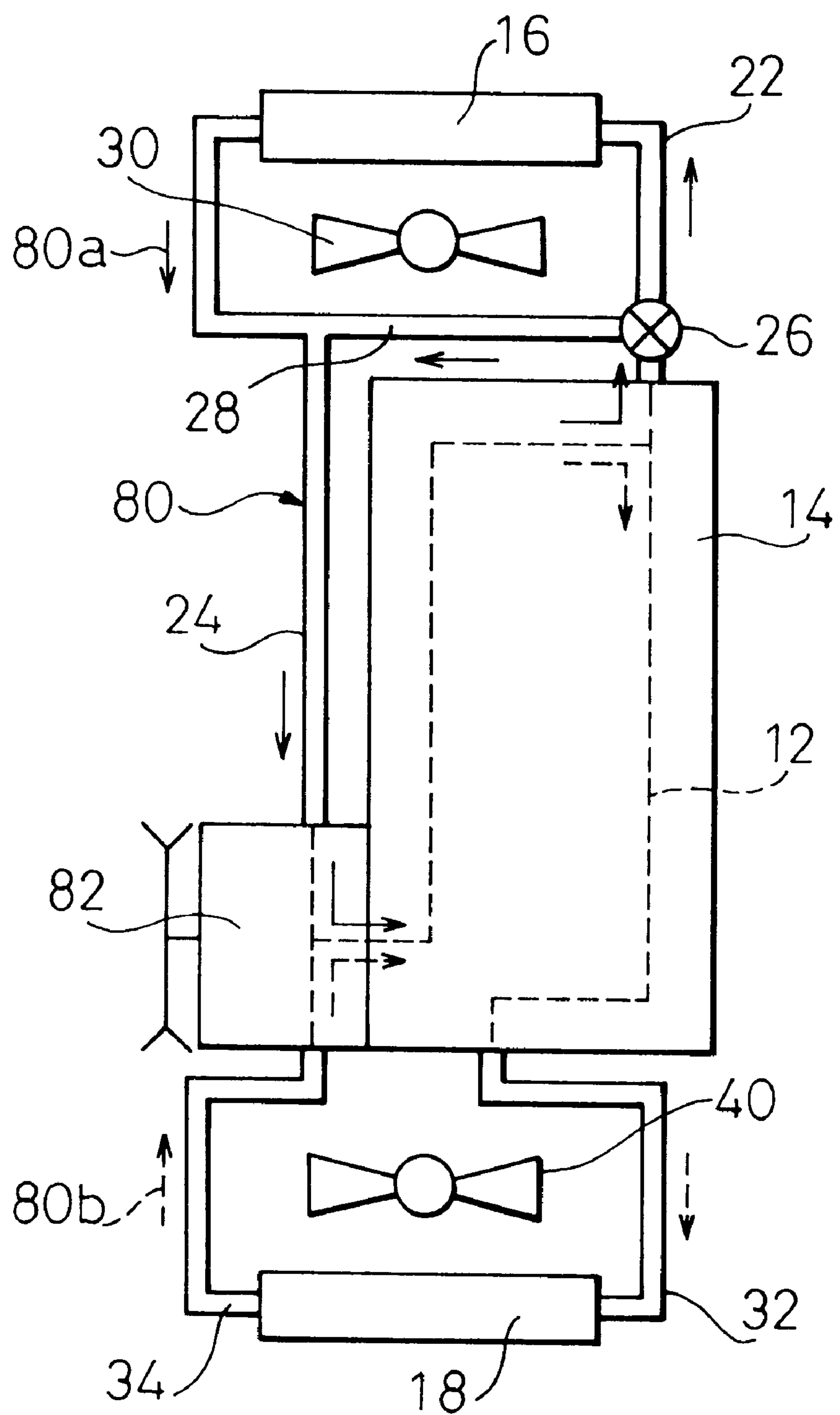
FIG. 3 is a schematic and diagrammatic illustration of a second embodiment of a coolant circulation system according to the present invention.

FIG. 3 shows a second embodiment of a coolant circulation system according to the present invention. The coolant circulation system of the second embodiment, incorporated in a motor vehicle (not shown), includes a coolant circulation circuit 80 which extends to provide a fluidic communication between a water jacket or coolant passage 12 formed in a liquid-cooled vehicle engine 14, a radiator 16 in an engine cooling system of the vehicle, and a heat exchanger 18 in a passenger compartment heating system of the vehicle. The coolant circuit 80 includes a first circulation route 80*a* (shown by solid arrows) for the engine cooling system and a second circulation route 80*b* (shown by broken arrows) for the passenger compartment heating system. The coolant circuit 80 is substantially identical to the coolant circuit 10 of the first embodiment, except for the deletion of the fifth conduit 38 in the coolant circuit 80, and thus the detailed description of the identical components is not repeated.

The coolant circulation system of the second embodiment also includes a heat generator 82 to which a water or coolant pump is integrally incorporated. The heat generator 82 integrally including the coolant pump is provided adjacent to and operationally connected with the engine 14, to forcibly circulate a coolant or cooling fluid, generally made of water, in the circuit 80 and to additionally heat the coolant circulating through the circuit 80. The output side of a pump chamber of a coolant pump section (as described later) of the heat generator 82 is directly connected to the inlet of the coolant passage 12 of the engine 14.

Figure 4:
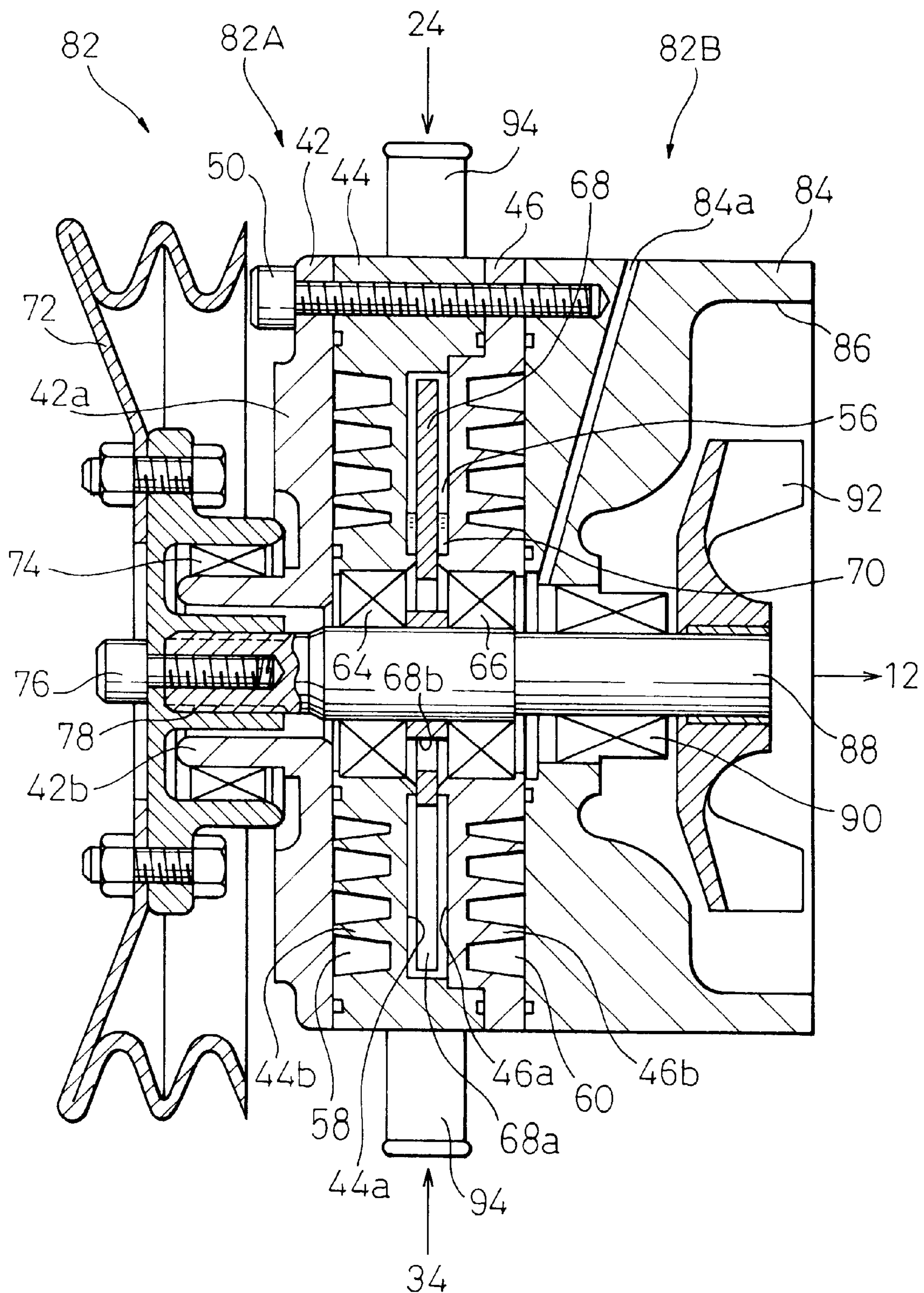
FIG. 4 is a vertical sectional view of a heat generator used in the coolant circulation system of FIG. 3.

As shown in FIG. 4, the heat generator 82 includes a heat generator section 82A having features substantially identical to those of the heat generator 36 of the first embodiment, except for the features described below, and a coolant pump section 82B formed integrally with the heat generator section 82A. A detailed description of the identical components of the heat generator section 82A is not repeated.

The heat generator 82 includes a rear housing body 84 which is axially and tightly combined with a front housing body 42, a front partition plate 44 and a rear partition plate 46 by a plurality of screw bolts 50 to form a housing assembly of the heat generator 82, in the same manner as the heat generator 36. The rear housing body 84 defines at the front side thereof a rear heat receiving chamber 60 of the heat generator section 82A with the rear partition plate 46, while it defines at the rear side thereof a pump chamber 86 of the coolant pump section 82B. The pump chamber 86 communicates with the front and rear heat receiving chambers 58, 60 of the heat generator section 82A through channels (not shown) formed respectively in the front and rear partition plates 44, 46 and the rear housing body 84.

A drive shaft 88, onto which a rotor element 68 is fixedly mounted or press fitted for rotation within a heat generating chamber 56, is extended rearward through the center through hole of the rear housing body 84 to the interior of the pump chamber 86. The drive shaft 88 is rotatably supported by bearing units 64, 66 on the front and rear partition plates 44, 46 and through a shaft sealing device 90 on the rear housing body 84. The rear housing body 84 is also provided with a ventilation hole 84*a* to communicate the space defined between the bearing unit 66 and the shaft sealing device 90 with the atmosphere surrounding the heat generator 82. An impeller 92 is fixedly mounted onto the drive shaft 88 at the rear end of the latter, and is arranged within the pump chamber 86 for rotation together with the drive shaft 88.

The front partition plate 44 is also provided on the circumferential surface thereof with a pair of inlet ports 94, one of which is connected with the second conduit 24 of the first circulation route 80*a* of the coolant circuit 80 and the other is connected with the fourth conduit 34 of the second circulation route 80*b* of the circuit 80. The inlet ports 94 communicate with the front and rear heat receiving chambers 58, 60 through channels (not shown) formed respectively in the front and rear partition plates 44, 46.

The coolant circulating through the first and second circulation route 80*a*, 80*b* is introduced from the second and fourth conduit 24, 34 through the inlet ports 94 into the front and rear heat receiving chambers 58, 60 of the heat generator section 82A of the heat generator 82, flows along substantially circular passages defined by annular ridges 44*b*, 46*b* in the front and rear heat receiving chambers 58, 60, and is discharged from the front and rear heat receiving chambers 58, 60 directly into the pump chamber 86 of the coolant pump section 82B of the heat generator 82.

It will be appreciated that the mode of operation of the coolant circulation system of the second embodiment, as well as the advantageous effects thereof, are essentially the same as those of the first embodiment.

In addition, the coolant circulation system of the second embodiment uses the heat generator 82 wherein the heat generator section 82A and the coolant pump section 82B are integrally combined and wherein the rear housing body 84 and the drive shaft 88 are provided as components in common with both sections 82A, 82B, so that the fifth conduit 38 used in the first embodiment can be eliminated and that both the rotor element 68 and the impeller 92 can be driven by the drive shaft 88 through the single pulley 72. Therefore, it is possible to reduce the number of components and thus decrease a production cost. Further, it is made easier to mount the coolant circulation system on the motor vehicles. It should be understood that at least one of the rear housing body 84 and the drive shaft 88 may be provided as a common component in both sections 82A, 82B.

While the invention has been particularly shown and described with reference to preferred embodiments thereof, it will be understood by those skilled in the art that various changes and modifications may be made without departing from the spirit and scope of the invention. In any case, the scope of the invention is therefore to be determined solely by the appended claims.

We claim:

1. A coolant circulation system for circulating a coolant through a coolant passage of an engine, a radiator of a cooling system and a heat exchanger of a heating system, comprising:

a coolant circuit provided for a fluidic communication between said coolant passage, said radiator and said heat exchanger, a coolant being forcibly circulated in said coolant circuit; and a supplementary heat source arranged in said coolant circuit to heat the coolant flowing out of said heat exchanger, wherein the coolant heated by said supplementary heat source is directed to said coolant passage.

2. The coolant circulation system of claim 1, wherein said coolant circuit includes a first circulation route in which said radiator is arranged and a second circulation route in which said heat exchanger is arranged, said first and second circulation routes defining a parallel circuit relative to said coolant passage.

3. The coolant circulation system of claim 2, further comprising a valve provided in said first circulation route to shut off a coolant flow from said coolant passage to said radiator.

4. The coolant circulation system of claim 3, further comprising a conduit provided in said first circulation route to bypass said radiator, wherein said valve changes a coolant flowing direction in said first circulation route to direct the coolant toward either one of said radiator and said conduit.

5. The coolant circulation system of claim 1, wherein said supplementary heat source comprises a heat generator which includes a housing assembly defining therein a heat generating chamber and a heat receiving chamber arranged adjacent to said heat generating chamber, said heat receiving chamber permitting the coolant to flow through said heat receiving chamber to thereby receive heat transferred from said heat generating chamber; a drive shaft rotatably supported by said housing assembly; a rotor element mounted on said drive shaft for rotation within said heat generating chamber, said rotor element including outer surfaces defining a gap with inner wall surfaces of said heat generating chamber; and a viscous fluid held in said gap for heat generation when a shearing stress is applied by the rotation of said rotor element.

6. The coolant circulation system of claim 5, further comprising a pump provided to forcibly circulate the coolant in said coolant circuit, wherein at least one of said housing assembly and said drive shaft of said heat generator is in common use in said pump.

7. A method for circulating a coolant through a coolant passage of an engine, a radiator of a cooling system and a heat exchanger of a heating system, comprising the steps of:

heating the coolant just having passed through said heat exchanger at an outside of said coolant passage of said engine; and directing the coolant thus heated toward said coolant passage.

8. The method of claim 7, wherein the coolant is circulated in a coolant circuit including a first circulation route in which said radiator is arranged and a second circulation route in which said heat exchanger is arranged, said first and second circulation routes defining a parallel circuit relative to said coolant passage.

* * * * *